(12) United States Patent
Van Der Wal

(10) Patent No.: US 7,762,482 B2
(45) Date of Patent: Jul. 27, 2010

(54) METHOD FOR COMMINUTING POLYMERIC SHAPED ARTICLES BY MILLING

(75) Inventor: Albert Van Der Wal, Sleeuwijk (NL)

(73) Assignee: Purac Biochem BV, Gorinchem (NL)

( * ) Notice: Subject to any disclaimer, the term of this patent is extended or adjusted under 35 U.S.C. 154(b) by 128 days.

(21) Appl. No.: 11/988,291

(22) PCT Filed: Jul. 6, 2006

(86) PCT No.: PCT/EP2006/063965

§ 371 (c)(1),
(2), (4) Date: Mar. 25, 2008

(87) PCT Pub. No.: WO2007/003659

PCT Pub. Date: Jan. 11, 2007

(65) Prior Publication Data

US 2008/0315020 A1    Dec. 25, 2008

(30) Foreign Application Priority Data

Jul. 6, 2005    (EP)    ................................. 05106142

(51) Int. Cl.
*B02C 19/00*    (2006.01)
(52) U.S. Cl. .............................. 241/3; 241/23; 241/29; 241/DIG. 14
(58) Field of Classification Search ................. 241/29, 241/152.2, 260.1, 3, 23, DIG. 14
See application file for complete search history.

(56) References Cited

U.S. PATENT DOCUMENTS

| 3,978,179 | A | * | 8/1976 | Sundhauss | .................. 264/109 |
| 6,164,876 | A | | 12/2000 | Cordovano | |
| 6,849,215 | B2 | * | 2/2005 | Khait | .......................... 264/118 |
| 2003/0026975 | A1 | | 2/2003 | Rouse et al. | |

FOREIGN PATENT DOCUMENTS

| DE | 1 607 475 | 9/1969 |
| EP | 0 026 574 A1 | 4/1981 |
| GB | 676280 | 7/1952 |
| JP | A 60-94212 | 5/1985 |
| JP | A 61-115922 | 6/1986 |
| JP | A 10-138031 | 5/1998 |

\* cited by examiner

*Primary Examiner*—Mark Rosenbaum
(74) *Attorney, Agent, or Firm*—Oliff & Berridge, PLC

(57) ABSTRACT

The invention pertains to a method for comminuting a polymeric shaped article to particles having an average particle size smaller than 6 mm by using a grinding apparatus, characterized in that the shaped article prior to grinding is subjected to a milling step in a milling apparatus to substantially fully convert the shaped article into chips, after which the chips are fed into the grinding apparatus for further comminuting giving at least 25 wt. % less particles having a size less than 1 mm than obtained by the grinding step only.

11 Claims, 2 Drawing Sheets

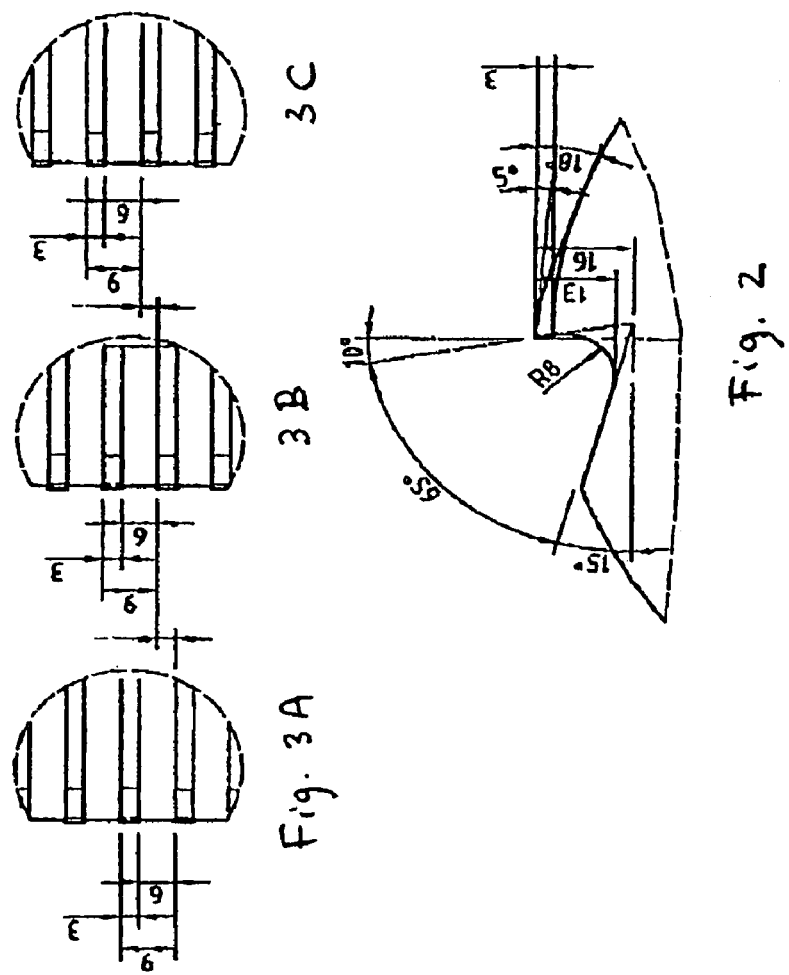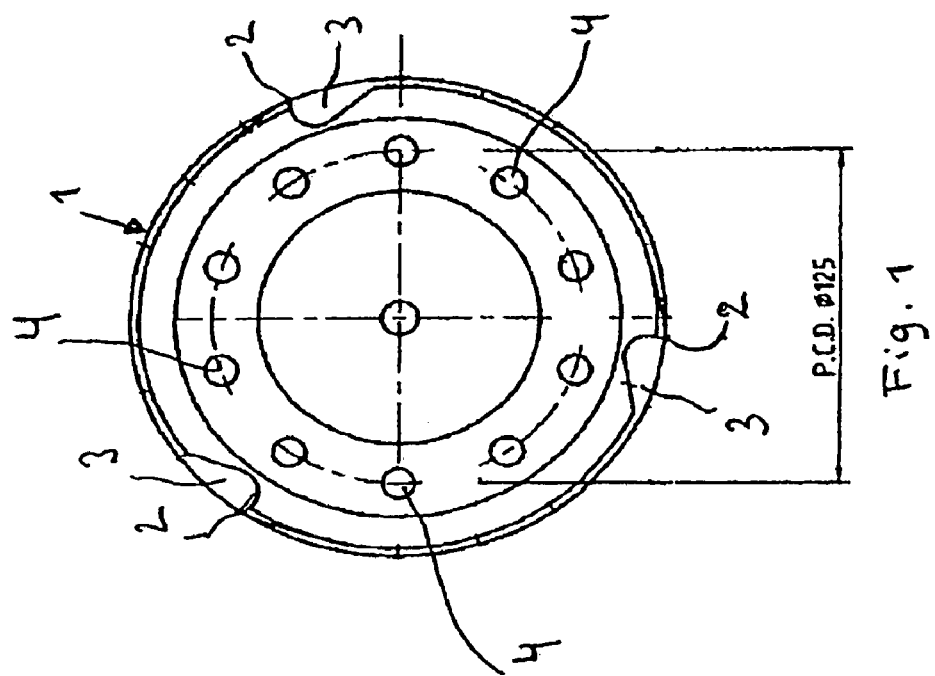

METHOD FOR COMMINUTING POLYMERIC SHAPED ARTICLES BY MILLING

The invention relates to a method for comminuting a polymeric shaped article to small particles.

Many methods are known to comminute materials. For instance, in DE 1607475 a knife mill is described. Such mills can conveniently be used for comminuting shaped articles, or parts thereof, into small particles, but they also have inherent disadvantages that limit their usability. For instance, large shaped articles cannot be fed as such in such apparatus, and their size must be reduced before entering the grinding apparatus or they must be made brittle to facilitate the grinding. By cooling the shaped article with liquid nitrogen the material can be made brittle, but it makes special equipment necessary that can stand such low temperatures, and further the materials will easily attract water under these conditions. Further, these grinding methods invariably lead to the formation of substantial amounts of fines. Fines are small particles having a size of less than 1 mm, which particles are difficult to feed in polymer processing equipment such as extruders or injection moulding machines. These fines should therefore be removed, which necessitates the use of a separate sieving step, and moreover, leads to loss of material. The latter particularly counts when the material is expensive such is the case in polymers for use in medical applications. Another disadvantage of a grinding apparatus such as above-mentioned knife mill is the occurrence of heat when large lumps or parts of polymeric materials are grinded. The heat evolved can melt or soften materials which melting point or glass transition point is relatively low. When grinding such low melting or low Tg products, the molten or tacky material may impair the functioning of the grinding apparatus. Such heat is further detrimental for those polymers that are heat labile and which can degrade upon heating. Furthermore, it is regularly observed that many knife grinding apparatuses release small metal particles from their knifes when grinding large lumps, particularly when such apparatus are not particularly designed for grinding polymers. It is therefore an object of the present invention to provide a method for comminuting a polymeric shaped article to small particles without obtaining substantial amounts of fines and excessive heat formation, and avoiding obtaining metal particles in the grinded end product.

It was now found that adding small well-defined particles to grinding apparatuses substantially prevents the formation of fines, formation of excessive heat, en occurrence of metal particles, and usually leads to narrow particle distributions.

To this end the invention pertains to a method for comminuting a polymeric shaped article to particles having an average particle size smaller than 6 mm by using a grinding apparatus, characterized in that the shaped article prior to grinding is subjected to a milling step in a milling apparatus to substantially fully convert the shaped article into chips, after which the chips are fed into the grinding apparatus for further comminuting giving at least 40 wt. % less particles having a size less than 1 mm than obtained by the grinding step only. In a preferred embodiment at least 50 wt. % less, preferably at least 80 wt. % less, even more preferably at least 90 wt. % less particles having a size less than 1 mm are obtained than obtained by the grinding step only. In another embodiment the invention also relates to obtaining particles having at least 40 wt. % less particles having a size less than 0.5 mm than obtained by the grinding step only. More preferably at least 70 wt. %, most preferably at least 80 wt. % less particles having a size less than 0.5 mm are obtained than obtained by the grinding step only The average particle size is determined by sieving according to common manners known to the skilled man.

The present invention allows using polymeric shaped articles of any shape, such as plates, bottles, rods, bullets, and the like. For economical reasons, most suitably plates are used, since these are easy manageable. Suitable plates have for instance a length of 0.5 to 1.5 m, a width of 0.3 to 0.7 m, and a thickness of 0.04 to 0.06 m. Other sizes can also be used and thickness generally varies between 0.01 and 0.16 m. The shaped articles can in principle be of any polymeric materials, but polyesters are particularly suitable. Interesting polyesters for use in the present method are polylactide, polylactide copolymer, polyglycolide, polyglycolide copolymer, poly-lactide-polyglycolide copolymer and elastic or flexible polymers as capro(co)polymers.

The grinding apparatus can be any conventional grinding apparatus, for instance a knife mill such as described in DE 1607475.

The milling apparatus can in principle be any apparatus that makes small pieces of the shaped article. Such pieces should be small enough to prevent the common disadvantages that are associated with grinding apparatus in general, i.e. heat formation and occurrence of fines. It was found that chips having the dimensions L×W×T being 1 to 16 cm (more preferably 3 to 10 cm)×0.5 to 10 mm×0.1 to 10 mm are particularly useful, wherein L stands for the length, W stands for width, and T stands for the thickness of the chip. For example, a chip having L×W×T 5 cm×3 mm×2 mm can easily be made and can be further comminuted in a knife mill without excessive heat and fine formation. The length L of the chip is determined by the thickness of the shaped article. Thus a plate having a thickness of 5 cm will lead to chips having L=5 cm. The width W of the chip is determined by the width of the tooth of the milling apparatus, and thickness T of the chip is determined by the height of the tooth of the milling apparatus.

The above chips most easily can be made by applying a milling apparatus comprising a rotateably mounted cylinder-like device comprising teeth for milling the shaped article, which teeth are configured as at least one helix onto the cylinder-like device. The cylinder-like device is a cylinder, a tapered cylinder, a flatted cylinder such as ellipsoid-like, or the like that rotates. The cylinder-like device (herein further called cylinder) preferably has at least the length corresponding to the width of the shaped article. When the length of the cylinder is smaller than the width of the shaped article the cylinder must be transported from left to right and vice versa, to fetch the whole width of the shaped article. Although possible, this unnecessary complicates the apparatus. For similar reasons it is easier to move the shaped article into the direction of the cylinder, than moving the cylinder towards the shaped article, or to move both to each other.

A suitable milling apparatus comprises a table to put on the shaped article, preferably a plate or block. To prevent unnecessary moving of the article and to prevent humidity from attacking the polymer, the apparatus is preferably closed from the environment by closing a lid or cover over the table with article and the cylinder. The so closed space can be brought under an inert atmosphere, such as by purging with dry air too prevent the polymer reacting with water or with dry nitrogen to prevent the polymer reacting with water and oxygen.

The cylinder containing milling teeth is rotated whereas the plate or block is fed to the direction of the cylinder. When the surface of the polymer plate touches the cylinder, the teeth thereof mill away the material of said surface of the plate.

The cylinder comprises teeth for milling the shaped article, which teeth are configured as at least one helix-onto the cylinder-like device. More preferably, the cylinder contains more, for instance three, parallel helices. These helices of teeth allow simultaneous removal of polymeric materials from the article at the same time at different sites, and by rotating the cylinder these sites move from left to right, or right to left dependent on the direction of the helices. It is convenient to select the width of the teeth, the distance of the teeth in one helix, the distance between the helices, and the pitch of the helices in such manner that one full rotation (one revolution) is just sufficient to remove the whole surface of the shaped article. Of course, it is for instance possible to double the number of helices, without changing the other parameters. In that case half a revolution is required to remove the whole surface. It is further clear to the skilled artisan to make the required configuration to obtain the wanted result. For instance, the pitch may be 0-60°, or even larger. Usually, a pitch of 30-40°, for instance about 35°, suffices to obtain a full removal of the surface after one revolution of the cylinder. The milling teeth may have a width of 0.5 to 10 mm and a height of 0.1 to 10 mm. These values determine the width and to a large extent also the thickness of the chips. Preferably, the teeth have a width of about 3 mm and a height of about 2 to 3 mm. If the teeth have a width of a mm, and the number of helices is b, the distance between the teeth within one helix is preferably a*b mm. Thus with three helices, a tooth width of 3 mm, and a distance of 9 mm between the teeth, the total surface of the plate is removed in one revolution. When the height of the teeth is 3 mm the thickness of the chip is 3 mm maximally, but may be smaller when the cylinder is rotated faster or the feed of the shaped article is made slower. Maximum chip thickness c mm is obtained with a tooth height of c mm, using a rotation speed of the cylinder and a feed of the shaped article, wherein the ratio thereof is c, in the case that the complete surface is removed in one revolution of the cylinder. In above example having three helices, a rotating speed of the cylinder of 20 rpm and a feed of 60 mm/min gives a thickness of 3 mm when using teeth having 3 mm height.

If the material to be comminuted is very heat sensitive it is possible to cool the milling cylinder, for instance by applying a cooling spiral to the inner side of the cylinder. Such cooling spiral can be cooled by means of water. If no cooling spiral is present or the cooling is insufficient, the cylinder can be used intermittently, i.e. the cylinder is subsequently rotated to mill and stopped to allow the polymer to cool, or the feed of the article to the mill can intermittently be stopped to obtain a similar effect.

The invention is further illustrated by the Figures.

FIG. 1 shows a side view of a milling cylinder

FIG. 2 shows a detail of a tooth of the milling cylinder of FIG. 1

Figure 4:
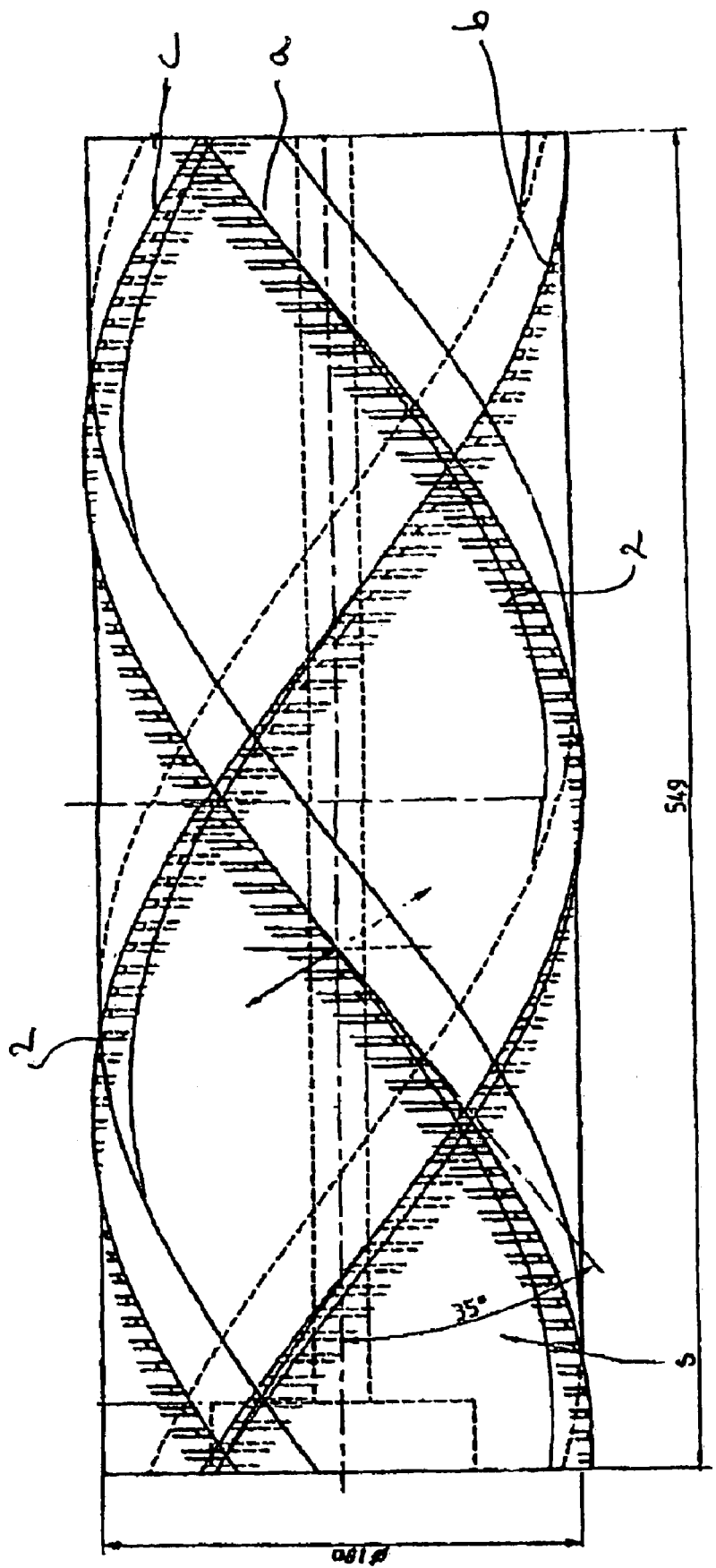

FIGS. 3A, B, and C show a detail of a cut by the milling cylinder of FIG. 1 during the rotation of the cylinder.

FIG. 4 shows a projection of a longitudinal section of the cylinder with a pattern of three helices of teeth.

FIG. 1 shows a cylinder 1 having three teeth 2, each one belonging to one of the helices 3, and cooling spirals 4. In FIG. 2 a detail of a side view of a tooth is given, showing a tooth angle of 65° and a height of 3 mm. In FIG. 3 the cutting lines obtained by the teeth have a width of 3 mm (the numbers in this figure are in mm). These cutting lines are moved 3 mm at each new tooth, thus after 3 teeth (which is one revolution), the complete surface is removed. The article is slowly moved into the direction of the cylinder, after which at each full revolution of the cylinder the surface of the article is completely removed.

In FIG. 4 three helices a, b, and c are shown, each containing a multitude of teeth 2. The pitch 5 is 35°.

The following experiments show the advantage of the invention with respect to the amount of fines formed.

EXAMPLE 1

A plate of a lactide-glycolide copolymer (53/47 mole %, inherent viscosity (IV) 0.99 dl/g, chloroform 25° C.) (500× 50×200 mm) was grinded in a knife mill (Rapid GK 600RC) and the particle distribution (w/w %) was determined by using standard sieves (prior art). The experiment was repeated but prior to grinding the plate was milled by a milling apparatus, under the following conditions (invention).

Milling cylinder width: 55 cm.

Three helices of teeth having a pitch 35°, distance between helices 3 mm, teeth width 3 mm, distance between teeth in one helix 9 mm. Rotation speed cylinder 20 rpm, speed plate 49 mm/min.

| Particle size mm | Prior art | Invention |
|---|---|---|
| >4 | 0 | 0 |
| 4.00-2.36 | 4.5 | 27.0 |
| 2.36-2.00 | 10.3 | 20.7 |
| 2.00-1.40 | 47.1 | 31.7 |
| 1.40-1.00 | 20.7 | 12.1 |
| 1.00-0.5 | 14.4 | 7.4 |
| <0.5 | 3.8 | 1.7 |

Result: 50% improvement with regard to particles <1 mm and 55% improvement with regard to particles <0.5 mm

EXAMPLE 2

A plate of a poly L-lactide (500×50×200 mm; IV 3.4 dl/g, chloroform 25° C.) was grinded with and without applying a milling apparatus as in Example 1. The results are:

| Particle size mm | Prior art | Invention |
|---|---|---|
| >4 | 0 | 0 |
| 4.00-2.36 | 4.5 | 44.9 |
| 2.36 2.00 | 12.1 | 21.8 |
| 2.00-1.40 | 51.4 | 22.5 |
| 1.40-1.00 | 18.7 | 6.2 |
| 1.00-0.5 | 10.8 | 4.4 |
| <0.5 | 2.8 | 1.0 |

Result: 60% improvement with regard to particles <1 mm: and 64% improvement with regard to particles <0.5 mm

EXAMPLE 3

According to the previously described methods polymer plates were grinded with (according to invention) or without (according to prior art) a milling step. The following table shows the amounts of fines obtained by these methods.

| Polymer | Particle size (mm) | Prior art (%) | Invention (%) |
|---|---|---|---|
| PLLA (2.05-2.55)* | <1 | 18.7 (3) | 2.6 (2)** |
| PLLA (2.05-2.55) | <0.5 | 5.4 (1) | 1.6 (1) |
| PLLA (2.3-2.8) | <0.5 | 3.1 (2) | 0.1 (4)# |
| PLLA (2.7-3.5) | <0.5 | 2.9 (2) | 0.07 (4) |
| PLLA (3.4-4.0) | <0.5 | 2.0 (1) | 1.0 (3) |
| L/D/G 85/5/10 (5.0-6.3) | <0.5 | 0.7 (1) | 0.2 (1) |
| L/DL 70/30 (5.5-7.0) | <0.5 | 1.4 (1) | 0.04 (1) |

-continued

| Polymer | Particle size (mm) | Prior art (%) | Invention (%) |
|---|---|---|---|
| L/G 85/15 (2.7-3.3) | <0.5 | 1.7 (1) | 0.5 (3) |
| L/G 85/15 (2.0-2.5) | <0.5 | 1.7 (3) | 0.03 (1) |

PLLA = poly-L-lactide
L/D/G = L-lactide-D-lactide-glycolide copolymer
L/DL = L-lactide-D,L-lactide copolymer
L/G = L-lactide-glycolide copolymer
*numbers between brackets are intrinsic viscosities in dl/g
**integers between brackets are number of experiments. Percentage is average of experiments
IV 2.2-2.7 dl/g

The invention claimed is:

1. A method for comminuting a polymeric shaped article to particles having an average particle size smaller than 6 mm by using a grinding apparatus, the method comprising:
    prior to grinding, subjecting the shaped article to a milling step in a milling apparatus to substantially fully convert the shaped article into chips having dimensions L×W×T being 1 to 16 cm ×0.1 to 10 mm ×0.5 to 10 mm, wherein L stands for the length, W stands for width, and T stands for the thickness of the chip,
    after the milling step, feeding the chips into the grinding apparatus for further comminuting giving at least 40 wt. % less particles having a size less than 1 mm than would have been obtained by the grinding step only.

2. The method according to claim 1 wherein the feeding step obtains at least 40 wt. % less particles having a size less than 0.5 mm than would have been obtained by the grinding step only.

3. The method according to claim 1, wherein the grinding apparatus is a knife mill.

4. The method according to claim 1 wherein the chips are obtained by moving a surface of the shaped article towards the milling apparatus, which comprises a rotateably mounted cylinder-like device comprising teeth for milling the shaped article, which teeth are configured as at least one helix onto the cylinder-like device.

5. The method according to claim 4, wherein the teeth for milling the shaped article are configured onto in three parallel helices having such a distance to each other that the whole surface of the shaped article that is fed to the milling apparatus is milled from the article in one revolution of the cylinder-like device.

6. The method according to claim 4, wherein the milling apparatus has teeth having a length of 0.1 to 10 mm and a height of 0.1 to 10 mm, which teeth are configured in at least one helix having a pitch of 0-60°.

7. The method according to claim 4, wherein the cylinder-like device of the milling apparatus is cooled during the milling step.

8. The method according to claim 7, wherein:
    the milling step is performed in a milling apparatus; and
    the shaped article and the rotateably mounted cylinder-like device are included in a housing that can be closed from the environment.

9. The method according to claim 1, wherein the shaped article is a plate having a thickness of 1 to 16 cm.

10. The method according to claim 1, wherein the shaped article is a polyester, including polylactide, polylactide copolymer, polyglycolide, polyglycolide copolymer, polylactide-polyglycolide copolymer, and elastic or flexible polymers including capro(co)polymers.

11. The method according to claim 4, wherein the milling apparatus has teeth having a length of 0.1 to 10 mm and a height of 0.1 to 10 mm, which teeth are configured in at least one helix having a pitch of 30-40°.

* * * * *